Figure 4:
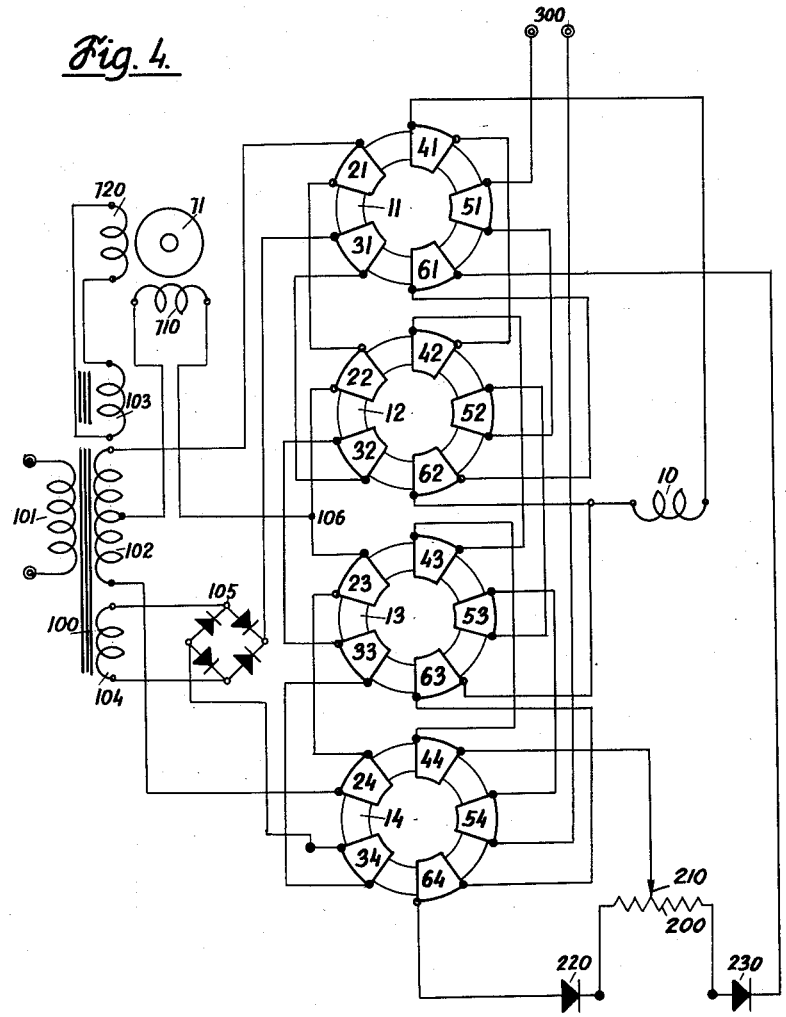

Jan. 16, 1962  B. DUBSKÝ ET AL  3,017,575
ELECTROMAGNETIC RECORDING APPARATUS
Filed March 4, 1959  2 Sheets-Sheet 1
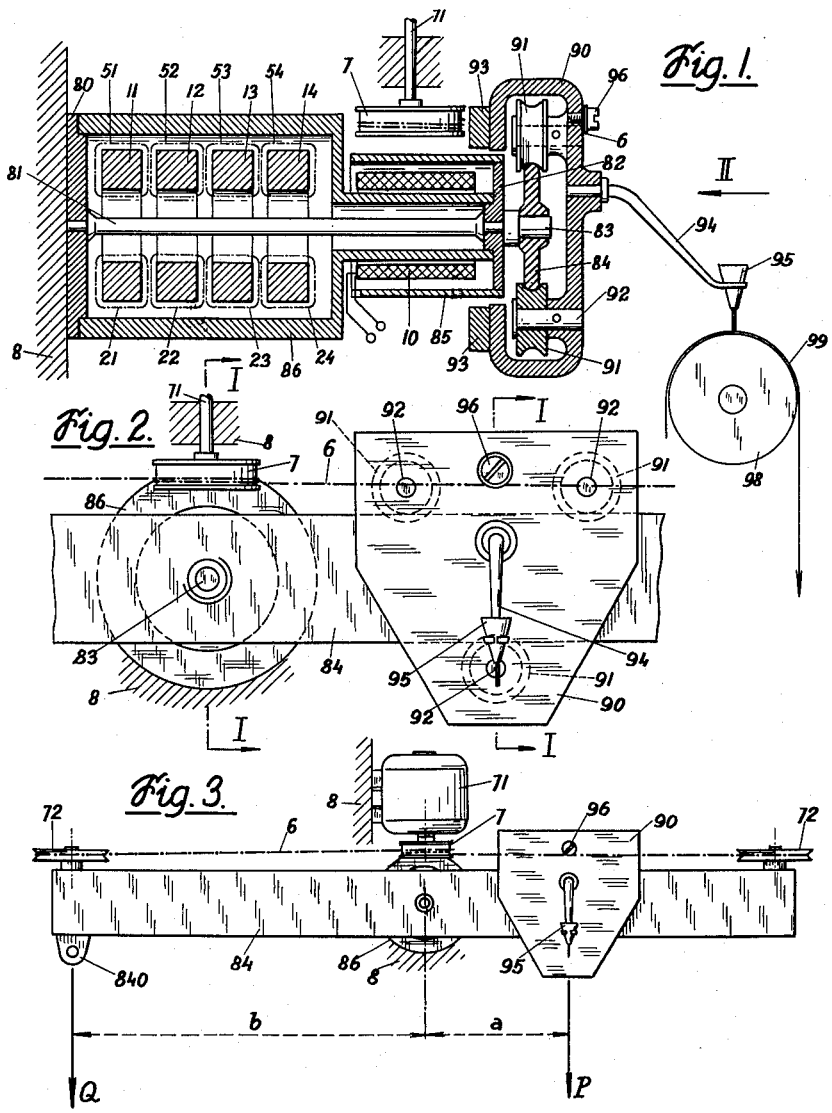
INVENTORS
Bořivoj Dubský ~ Oldřich
Straka ~ Josef Bican
By Richard ...
Agt Jan. 16, 1962   B. DUBSKÝ ET AL   3,017,575
ELECTROMAGNETIC RECORDING APPARATUS
Filed March 4, 1959   2 Sheets-Sheet 2

INVENTORS
Bořivoj Dubský ~ Oldřich
Straka ~ Josef Bican

By Richard Low
Agt

United States Patent Office 3,017,575
Patented Jan. 16, 1962

3,017,575
ELECTROMAGNETIC RECORDING APPARATUS
Bořivoj Dubský, Oldřich Straka, and Josef Bican, Prague, Czechoslovakia, assignors to Vyzkumny a zkusebni letecky ustav, Letnamzlar, Prague, Czechoslovakia
Filed Mar. 4, 1959, Ser. No. 797,296
Claims priority, application Czechoslovakia Mar. 7, 1958
1 Claim. (Cl. 324—99)

The present invention relates to an electromagnetic recording apparatus operating on the principle of torsional magnetostriction. Instruments of this type comprise annular cores, carrying torroidal windings as their operative members. The cores are mounted in a tube subject to a twisting stress, which in the following disclosure will be called a "torsional tube." Fitted on this tube is a suitable pick-up coil. The torsional tube is closed at both ends by metallic end walls and a conductor extends through the axis of the torsional tube, the conductor conductively connecting both end walls. A short-circuited coil is thus produced around the annular cores in any axial cross-section of this arrangement. By exciting the annular cores or the toroidal windings mounted thereon, alternating current is induced in the short-circuited coil, the current generating in the torsional tube an alternating magnetic field of cylindrical shape.

If the torsional tube is stressed by a twisting moment torque, a voltage proportional to the torque is generated or induced in the pick-up coil in accordance with the known principle of torsional magnetostriction, which is generally referred to as the inverse Wiedemann effect. In the previously known torsional magnetostriction devices of the aforementioned type this voltage has such a low value that, in order to impart movement to a recording stylus or to a servomotor, the use of an electronic amplifier is indispensable. This means, of course, an undesirable complication, apart from the fact that such an electronic amplifier is liable to frequent break-downs when operated for a considerable length of time.

The present invention aims at removing the aforesaid drawbacks. According to an essential feature of the invention the annular cores are used not only for exciting the torsional tube, but serve also as a magnetic amplifier. The alternating voltage of the pick-up coil, which is proportional to the torque, is, after rectification, supplied to so-called torroidal control windings which form the magnetic amplifier. A voltage, the course of which has to be recorded, is fed to other torroidal windings, which also are placed on the annular cores. The difference of this latter voltage and the voltage of the pick-up coil is then magnetically amplified and fed to a servomotor, which operates as follows:

The torque acting on the torsional tube is produced by a weight placed on a carriage which is displaced by means of the aforesaid servomotor along a horizontal rail rigidly connected to the torsional tube. The weight together with the carriage produce a torque, the size and direction of which are directly proportional to the distance of the carriage from the axis of the torsional tube. The carriage is automatically brought by the servomotor to a position in which the voltage of the pick-up coil, which is proportional to the torque, is balanced by the outer voltage which is to be registered. The position of the carriage thus directly represents a measure of this voltage. Arranged on the carriage is a stylus adapted to move along a travelling recording strip. The deflections of the rail being practically negligible (they are proportional to elastic deformations of a relatively thick-walled torsional tube) the stylus travels substantially in a straight line, so that the placing and arrangement of the recording means meets with no difficulties.

With the above purpose in view the invention provides for the arrangement of at least four annular cores with corresponding torroidal coils, the torroidal coils being connected so as to provide a magnetic amplifier, a servomotor being interposed between the feeding transformer and two torroidal windings. The drive of the carriage may be effected by means of a cable attached thereto and wound around a driving roller connected to the servomotor.

The accompanying drawings represent one example of carrying out the invention in practice and depict the corresponding wiring diagram. In the drawings FIG. 1 is a section through the axis of the magnetostriction feeler and also a cross-section through the rail and carriage along the line I—I from FIG. 2, FIG. 2 is a partial view in the direction of the arrow II from FIG. 1 showing the feeler, a part of the rail and the carriage, FIG. 3 shows on a smaller scale a view in the direction of the feeler axis, showing the power drive of the carriage and FIG. 4 is the wiring diagram.

The magnetostriction feeler is rigidly secured to a base-plate 8 on which the servomotor is mounted.

Accommodated in an enlarged portion of the torsional tube 86 are four annular cores 11, 12, 13, and 14. Each of them carries five entirely independent windings 21, 31, 41, 51, 61, or 22, 32, 42, 52, 62 or 23, 33, 43, 53, 63 or 24, 34, 44, 54, 64, as shown also in FIG. 4. A pick-up coil 10 is fitted on the narrow portion of the torsional tube 86, the coil 10 being covered by a casing 85 secured to one end wall 82. The opposite end-wall 80 is fastened to the base-plate 8. Mounted between both end-walls 80 and 82 is a rod-shaped conductor 81, the operation of which has been disclosed above. Secured non-rotatably to the outer end-wall 82 by means of a pin 83 is a horizontal rail 84, along which a carriage 90 is adapted to travel.

The carriage 90 is mounted on the rail 84 by means of three rollers 91, which are arranged for free rotation on fixed pivots 92. Suitable weights 93 are fixed to one side of the carriage 90, while the other side is provided with an arm 94 carrying a stylus 95. During travel of the carriage the stylus 95 effects registration on a recording paper-strip 99, which proceeds over a recording roller 98.

The carriage 90 is displaced by means of a servomotor 71 with the aid of a cable 6, which is secured to the carriage 90 below the head of a screw 96 and is passed around pulleys 72, mounted at the ends of the rail, and several times wound around a driving drum 7 connected to the servomotor 71.

The wiring diagram of the apparatus is shown in FIG. 4. The annular cores 11, 12, 13 and 14 are provided with exciting torsional windings 21, 22, 23 and 24 which are connected in series to a main secondary winding 102 of a feeding transformer 100, the primary winding 101 of which is connected to a source of alternating current. The further torroidal windings 31, 32, 33 and 34 are connected in the following manner: Both ends of windings 31 and 32 are connected together, as well as the ends of windings 33 and 34 and both beginnings of windings 32 and 33 are also connected together. The beginnings of windings 31 and 34 are attached to a two-way rectifier 105 which is supplied from an auxiliary secondary winding 104 of the transformer 100.

The torroidal control windings 41, 42, 43, and 44 are connected as follows: The ends of windings 41 and 42 are connected together, as well as the beginnings of windings 43 and 44 and the beginning of the winding 42 is connected to the end of the winding 43. The end of the winding 44 is attached to a runner 210 of a potentiometer 200.

The beginning of the torroidal winding 41 is connected to one end of a pick-up coil 10, the other end of which is attached to a junction point between further torroidal windings 63 and 62. These torroidal windings 62 and 63 are connected in series with similar torroidal windings 61 and 64 of the neighbouring annular cores 11 and 14 and serve for generating a polarization voltage in the circuit of the pick-up coil 10.

The beginning of the torroidal winding 61 and the end of the torroidal winding 64 are connected over one-way rectifiers 230 or 220 respectively to both ends of the potentiometer 200.

The voltage which has to be measured or registered is supplied to terminals 300, whence it is fed into four torroidal windings 51, 52, 53 and 54 which are connected in series. These torroidal windings are connected as follows: The ends of windings 51 and 52 are connected together as well as the beginnings of windings 53 and 54 and the beginning of winding 52 is connected to the end of winding 53.

The wiring works as follows: Alternating current is induced in the torsional tube 86 by the alternating exciting current from the secondary winding 102 of the transformer 100 by means of the torroidal exciting windings 21, 22, 23 and 24, because—as disclosed in the opening paragraphs of this specification—the torsional tube 86 together with both end-walls 80 and 82 and with the conductor 81 form a short-circuited coil surrounding all annular cores 11, 12, 13, and 14. A cylindrical alternating magnetic field is thus produced in the torsional tube 86. When the torsional tube 86 is twisted by a given torque, the magnetic field is deformed so as to contain also a longitudinal component, proportional to the torque and inducing in the pick-up coil 10 a voltage, which is directly proportional to said torque.

The pick-up coil 10 is connected in the circuit of a discriminator, which consists of the potentiometer 200, both one-way rectifiers 220, 230 and all torroidal windings 61, 62, 63, and 64.

These windings supply to the circuit a polarization voltage which is necessary for shifting the operational points of both rectifiers 220 and 230 to the linear portion of their characteristic.

By means of the torroidal windings 31, 32, 33, and 34 fed from the source 105 of direct current, uni-directional magnetic fields are also generated in the annular cores 11, 12, 13 and 14. If a voltage is supplied to the terminals 300, direct current proportional to this voltage will flow through torroidal windings 51, 52, 53 and 54. Due to the connection of the torroidal windings 51 to 54 the unidirectional magnetic field in the cores 11 and 12 is increased by this current, while in the cores 13 and 14 it is reduced. Consequently, the inductances of the torroidal windings 21 to 24 are changed in such a manner, that the inductances of the windings 21 and 22 are reduced, whereas the inductances of the windings 23 and 24 are increased. These changes in the inductances of torroidal windings 21 to 24 give rise to an alternating current between the junction point 106 and the center of the secondary winding 102.

This alternating current flows through one control winding 710 of the servomotor 71, the other control winding 720 being permanently fed from a further auxiliary secondary winding 103 of the transformer 100. This alternating current therefore sets the servomotor 71 in operation, which starts to move the carriage along the rail 84.

Be it assumed that the weight of the carriage 90 including the weight 93 amounts to a value "P" (see FIG. 3). The torque is given by the product P.a, wherein the distance a is changed by displacement of the carriage 90. The movement of the carriage lasts until the torque produces in the pick-up coil 10 such a voltage that the current in the pick-up coil 10 rectified in the discriminator circuit and fed to the torroidal windings 41 to 44 cancels the unbalance of the unidirectional magnetic fields in the annular cores 11 to 14. When the equilibrium of said unidirectional magnetic fields is re-established, the current in the winding 710 of the servomotor 71 disappears and the servomotor comes to a standstill. This is due to the fact that the current from the pick-up coil 10 reduces by means of the torroidal windings 41 and 42 the uni-directional magnetic field in the annular cores 11 and 12. On the other hand, the same current from the pick-up coil 10, flowing through the torroidal windings 43 and 44, increases in the remaining annular cores 13 and 14 the corresponding unidirectional magnetic field.

The position of the carriage 90 which is given by the distance a and by the torque corresponding thereto is therefore a gauge of the direct voltage supplied to the terminals 300 of the apparatus.

The effect of the measured voltage or of the voltage of the pick-up coil 10 is still further enhanced by the fact that the polarization voltage induced in the torroidal windings 61 to 64 changes in proportion to the uni-directional magnetic field in the annular cores 11 to 14. An unbalance of voltages is thus produced also in the outer circuits of the discriminator, the unbalance acting as a feedback with respect to the measured voltage or to the voltage of the pick-up coil 10.

By shifting the runner 210 of the potentiometer 200 the rest-position of the carriage 90 on the rail 84 can be adjusted and thus the setting of the apparatus to the zero position effected.

The arrangement just described can be used for measuring the voltage fed to terminals 300; movement of the carriage 90—by means of the servomotor 71—brings the apparatus to a standstill. Within the scope of the present invention it is of course possible to bring the apparatus to a standstill by mechanical means, namely by subjecting the torsional tube 86 to the influence of an outer torque which is produced for example by a force Q, acting at a distance b from the centre of the rail 84 (FIG. 3). This outer torque automatically balances the total weight of the carriage 90 at the distance a from the centre of the rail 84. The distance a represents then a gauge for the outer force Q. The force Q may be derived for example from a scale-mechanism, from pressure diaphragms, or the like.

It is a considerable advantage of this arrangement that the deflection of the rail 84 and therefore also the change in the position of the point 840, in which the force Q is applied, is extremely small. Even under a considerable load, the rail 84 is deflected but to a negligible degree and this only within the extent of elastic deformations of the torsional tube 86.

Even if the servomechanism were liable to deflections due to the way in which outer forces are applied, a damping effect could be made use of, produced by conventional damping means, such as a dynamo or a branch circuit connected to the central branch of the discriminator.

The invention is in no way restricted to the described wiring. All torroidal windings can, within the framework of the invention, be connected also in different ways used in connection with magnetic amplifiers.

The apparatus according to the invention is very simple and reliable in operation, as it has for instance no frictional contacts or the like members. The apparatus may be used not only for direct recording of electrical values, but also for registering all values exerting a power influence, such as weight, pressure, position and the like. The apparatus can easily be used as a control or regulation member.

It is to be understood that the above described arrangements are only illustrative of the principles of the present invention. Numerous other arrangements may easily be devised by those skilled in the art without departing from the spirit and scope of this invention.

We claim:

In combination in an electromagnetic recording apparatus, a cylindrical magnetic member having a main axis, means including a conductive cap connected to each end of said member and a conductive element disposed along said main axis and connected to said caps for cylindrically magnetizing said member with respect to said main axis, said means also including four annular cores coaxially disposed with respect to said axis and being mounted about said element and within one portion of said member, each of said cores having an energizing winding thereon, said four energizing windings being connected in order in series-aiding, alternating current means including a center tap point for energizing said four energizing windings, a servo motor having a control winding connected between said center tap point and a point between the second and third ones of said series-aiding energizing windings, each of said cores also having thereon a second winding, said second windings being connected in order such that the first and second ones thereof, and the second and third ones thereof, are respectively connected in series-opposition and the third and fourth ones thereof are connected in series-opposition, direct current means for energizing said four second windings, each of said cores also having thereon a third winding, said third windings being connected so that the first and second ones thereof, and the third and fourth ones thereof, are connected in series-opposition and the second and third ones thereof are connected in series-aiding, terminal member means connected to said third windings, each of said cores also having thereon a fourth winding, said fourth windings being connected in order in the same manner as said third windings, pick-up coil means coaxially disposed with respect to said axis and wound outside of and about another portion of said member, said pick-up coil means being connected in series with the fourth windings, rectifying circuit means connected in series with said pick-up coil means and said fourth windings to form a closed electrical path, a rail member fixedly secured to one of said conductive caps, indicating carriage means arranged for movement on said rail member and coupled to said servo motor, whereby the application of an unknown direct current voltage to said terminal member means causes a direct current to flow through said third windings to unbalance the inductances of said energizing windings and to cause a current flow through said servo motor control winding to turn said motor to move said carriage means to torsionally deflect said magnetic member to induce a voltage in said pick-up coil means to cause a direct current to flow through said fourth windings in a direction to balance out the effect of the direct current flow arising from said applied unknown voltage.

References Cited in the file of this patent

UNITED STATES PATENTS

| | | |
|---|---|---|
| 1,572,949 | Pierce | Feb. 16, 1926 |
| 1,707,286 | Stickney | Apr. 2, 1929 |
| 2,469,005 | Russell | May 3, 1949 |
| 2,511,178 | Roters | June 13, 1950 |
| 2,579,629 | Tubbs | Dec. 25, 1951 |

FOREIGN PATENTS

| | | |
|---|---|---|
| 442,441 | Great Britain | Feb. 3, 1936 |